United States Patent
Ramsey (10) Patent No.: US 7,971,041 B2
(45) Date of Patent: Jun. 28, 2011

(54) METHOD AND SYSTEM FOR REGISTER MANAGEMENT

(75) Inventor: Randy Wayne Ramsey, Oviedo, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 366 days.

(21) Appl. No.: 12/129,457

(22) Filed: May 29, 2008

(65) Prior Publication Data

US 2009/0300634 A1    Dec. 3, 2009

(51) Int. Cl.
*G06F 12/06* (2006.01)
(52) U.S. Cl. ........................................................ 712/228
(58) Field of Classification Search .................. None
See application file for complete search history.

(56) References Cited

U.S. PATENT DOCUMENTS

| | | | | |
|---|---|---|---|---|
| 5,410,722 A * | 4/1995 | Cornaby | | 718/102 |
| 5,517,664 A * | 5/1996 | Watanabe et al. | | 712/41 |
| 5,564,031 A * | 10/1996 | Amerson et al. | | 711/209 |
| 5,890,000 A * | 3/1999 | Aizikowitz et al. | | 717/154 |
| 5,978,898 A * | 11/1999 | Hathaway et al. | | 712/208 |
| 6,425,124 B1 * | 7/2002 | Tominaga et al. | | 717/146 |
| 6,487,630 B2 * | 11/2002 | Bui | | 711/109 |
| 7,120,775 B2 * | 10/2006 | Liu et al. | | 711/170 |
| 7,127,592 B2 * | 10/2006 | Abraham et al. | | 712/217 |
| 7,475,262 B2 * | 1/2009 | Banginwar et al. | | 713/300 |
| 7,650,598 B2 * | 1/2010 | Lee et al. | | 717/144 |
| 2003/0188299 A1 * | 10/2003 | Broughton et al. | | 717/141 |
| 2003/0204636 A1 * | 10/2003 | Greenblat et al. | | 709/251 |
| 2004/0133766 A1 * | 7/2004 | Abraham et al. | | 712/217 |
| 2005/0216709 A1 * | 9/2005 | Tamai | | 712/228 |
| 2005/0216908 A1 * | 9/2005 | Keohane et al. | | 717/174 |
| 2006/0020776 A1 * | 1/2006 | Yoshida | | 712/235 |
| 2006/0098019 A1 * | 5/2006 | Tarditi et al. | | 345/505 |
| 2007/0192576 A1 * | 8/2007 | Moore et al. | | 712/242 |

* cited by examiner

*Primary Examiner* — Eric Coleman
(74) *Attorney, Agent, or Firm* — Sterne, Kessler, Goldstein & Fox P.L.L.C.

(57) ABSTRACT

A system and method of allocating registers in a register array to multiple workloads is disclosed. The method identifies an incoming workload as belonging to a first process group or a second process group, and allocates one or more target registers from the register array to the incoming workload. The register array is logically divided to a first ring and a second ring such that the first ring and the second ring have at least one register in common. The first process group is allocated registers in the first ring and the second process group is allocated registers in the second ring. Target registers in the first ring are allocated in order of sequentially decreasing register addresses and target registers in the second ring are allocated in order of sequentially increasing register addresses. Also disclosed are methods and systems for allocation of registers in an array of general purpose registers, methods and systems for allocation of registers to processes including shader processes in graphics processing units.

18 Claims, 8 Drawing Sheets

METHOD AND SYSTEM FOR REGISTER MANAGEMENT

BACKGROUND OF THE INVENTION

1. Field of the Invention

The present invention relates generally to register management in computer systems.

2. Background Art

Register management schemes are a factor in determining the efficiency of a computer system. Registers are used for sharing data between processes, as well as to temporarily hold data retrieved from random access memory (RAM) for processing. Information held in registers may include memory addresses and data for instruction execution. Registers are implemented using various well known methods, including register files.

Several types of registers are identified in the art. General purpose registers (GPR) can be used for holding addresses as well as data. The GPR resources available to processes in a computer are limited. In general, multiple concurrent processes may have read and/or write access to a given GPR. A number of well known schemes can be implemented to ensure that values written into a GPR by one process are not corrupted by another process. For example, one may implement a locking scheme whereby the process that writes a data item to a GPR maintains a lock on that GPR for the duration of the usefulness of that data. A register that is locked by one process is, in general, inaccessible to all other processes until it is unlocked. Any resulting contention conditions between processes for register resources may slow processing in the overall system. Therefore, a computer should manage its GPR resources so as to maintain the continued availability of GPRs to processes that require register resources.

In most existing register management schemes, the available GPRs are pre-allocated among the different application threads or processes at the time of application initiation. For example, a GPR array may be allocated to an application in a computer where the GPR array is mostly used for pre-fetching data from memory and holding until that data can be loaded to the respective local registers for processing by the constituent processes of the application. Sets of registers from this GPR array may be allocated to processes based on the expected volume of data used by each process. Such an allocation to processes is necessary in order to avoid deadlock conditions or prolonged waiting conditions that may occur due to dependencies among the processes. Deadlock or prolonged waiting conditions may occur due to dependencies among two or more processes.

A deadlock, as used herein, occurs when two processes sharing the same resource are effectively preventing each other, directly or indirectly, from accessing the resource, resulting in both processes being unable to progress. Many deadlock detection methods are known in the art. An application may be analyzed to determine dependencies among various processes included in the application, to determine groups of those processes that have the potential for deadlock.

Pre-allocation of registers to workloads at application initiation time may result in an allocation that is optimized for a particular set of workload demands. However, when the workload demand differs from what the register allocation was based on, many of the registers may not be fully utilized. Such under-utilization may be due to preventing the use of a register by any other workload than the workload it was originally allocated to. In order to minimize the under-utilization of the registers, some register management schemes attempt to dynamically change the allocations of sets of registers to workloads as the workload mix changes. This generally requires that the registers are flushed, set to idle, and then updated with new allocations, before the new allocations can be activated. Having to flush registers each time a substantial change in the workload mix occurs is expensive in terms of control overhead, execution delay, and wasted register resources.

What is needed therefore is a dynamic register management scheme that efficiently manages the available register resources.

BRIEF SUMMARY OF THE INVENTION

Briefly described, systems and methods of allocating registers in a register array to a plurality of workloads are disclosed. The methods identify an incoming workload as belonging to a first process group or a second process group, and allocate one or more target registers from the register array to the incoming workload. The register array is logically divided to a first ring and a second ring such that the first ring and the second ring have at least one register in common. The first process group is allocated registers in the first ring and the second process group is allocated registers in the second ring. In some embodiments of the present invention, target registers in the first ring are allocated in order of sequentially decreasing register addresses and target registers in the second ring are allocated in order of sequentially increasing register addresses.

Another embodiment of the present invention is a system for managing a register array for use in a computer, where the register array is logically divided to a first register ring and a second register ring, wherein the first register ring and the second register ring partially overlap, and wherein the first ring contains registers between the lowest addressable register of the register array up to a first ring limit and the second ring contains registers between the highest addressable register of the register array down to a second ring limit, and having a ring manager module. The ring manager module may include a register allocator module that allocates a first available register from the first ring to an incoming workload belonging to a first process group or a first available register from the second ring to an incoming workload belonging to a second process group, and a register deallocator module that deallocates a second register.

Embodiments of the present invention include methods and systems for allocation of registers in an array of general purpose registers. Other embodiments include methods and systems for allocation of registers to processes including shader processes in graphics processing units.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the invention and, together with the general description given above and the detailed description of the embodiment given below, serve to explain the principles of the present invention. In the drawings.

DETAILED DESCRIPTION OF THE INVENTION

While the present invention is described herein with illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

It would be apparent to one of skill in the art that the present invention, as described below, may be implemented in many different embodiments of software (which may include hardware description language code), hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

This disclosure presents methods and systems for the management of a register array in a computer. Several different register types and a number of different types of computers that use registers are known in the art. A person skilled in the art will recognize that the teachings provided herein may be applied to the management of registers of various types in computers. Without loss of generality, the environment described in this disclosure comprises mainly of an array of general purpose registers used primarily for holding pre-fetched data until that data may be loaded into respective local registers for processing by a particular process.

General purpose registers (GPR) may be used as target and source for many arithmetic and logic unit (ALU) operations and to load or store memory addresses. For example, in order for a process to use a value that is stored in random access memory (RAM), it may be read into a GPR using load instructions, and to store a value from a process to RAM, it may be stored to RAM from a GPR using a store instruction. GPRs are also used as targets and sources for many other instructions that read and write other register types.

The GPR resources available to processes in a computer are limited. In general, multiple processes may have read and/or write access to a given GPR. Register management schemes may be designed to prevent one process from corrupting or otherwise interfering with the values written by another process, and also to ensure that registers are allocated in an efficient manner. For example, optimally efficient use of a GPR array is made when all of the GPRs are actively occupied all of the time without requiring processes to slow their execution due to dependencies on each other or due to GPR availability. Another aspect of register management schemes is to avoid deadlock situations among concurrently executing processes due to register availability. The present disclosure includes methods and systems to manage a register array that is shared by multiple concurrently executing processes.

For ease of description, a GPR array of a plurality of sequentially addressable general purpose registers in contiguous memory is assumed. It should be noted however, that the disclosure herein is not limited to GPR arrays in contiguous memory. A person skilled in the art will understand that the teachings of this disclosure may be applied to various types of register sets in computer systems that are accessible by a plurality of concurrent processes. For example, registers belonging to one set may be distributed in a register space, and a mechanism such as, but not limited to, chaining or mapping of register addresses may be used to locate the registers as needed. The chaining or mapping of register addresses may allow the set of registers to be distributed in register space while being sequentially addressable.

Figure 1:
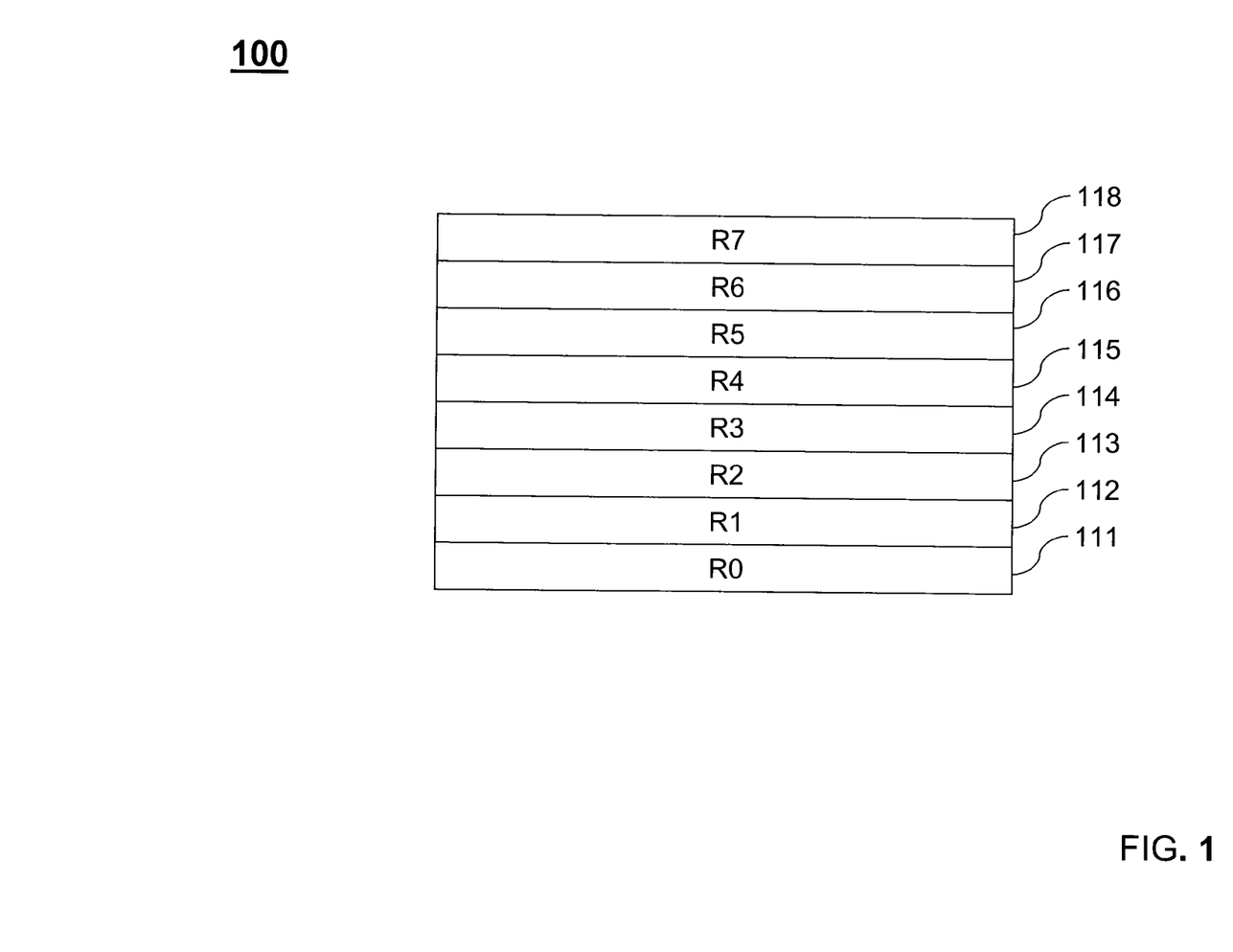
FIG. 1 is an example register array.

FIG. 1 is an exemplary array 100 of eight general purpose registers showing an exemplary addressing scheme relative to the base of the register array. The registers, from bottom 111 to top 118 of the array 100, are sequentially addressed from R0 to R7. In general, the registers in a register array are of a uniform size such as, for example, 32 or 64 bits. The number of registers in this example is for purposes of illustration only. The teachings in this disclosure are applicable to register arrays having any number of registers, and registers of any size. The teachings in this disclosure are also applicable to register arrays having non-uniform size registers.

In one embodiment, the present invention logically divides the register array into two register rings: ring 0 ("ring0") and ring 1 ("ring1"). Ring0 and ring1 are defined such that each begins allocating registers from opposite ends of the register array. For example in FIG. 1, ring0 may start allocating registers from the top (i.e., register with the highest address) register R7 118, and sequentially proceed towards the bottom of the register array 111. Ring1 may allocate registers starting at the bottom (i.e., register with the lowest address) register R0 111 and sequentially proceed towards the top of the register array 118. Ring0 and ring1 are defined so as to overlap in one or more registers ("overlap area").

To avoid or minimize potential deadlock conditions due to register resources, concurrently executing processes may be divided into separate groups according to predefined criteria. The different groups of processes are allocated registers only from the ring of registers assigned to the group. More specifically, a request for register resources for a particular workload is assigned from the ring of registers that corresponds to the process group to which the requesting process belongs. The set of processes to which registers from ring0 are allocated ("ring0_processes") may or may not be mutually exclusive of the set of processes to which registers from ring1 are allocated ("ring1_processes"). It may be desired that each set of processes is selected so that deadlock conditions do not occur among them. Criteria in grouping processes together in one set may include reducing the likelihood of deadlock situations, and/or reducing the likelihood of long waiting intervals among processes in each group. Methods of analyzing groups of processes to identify deadlock conditions and other dependencies are well known and are not described here.

Figure 2:
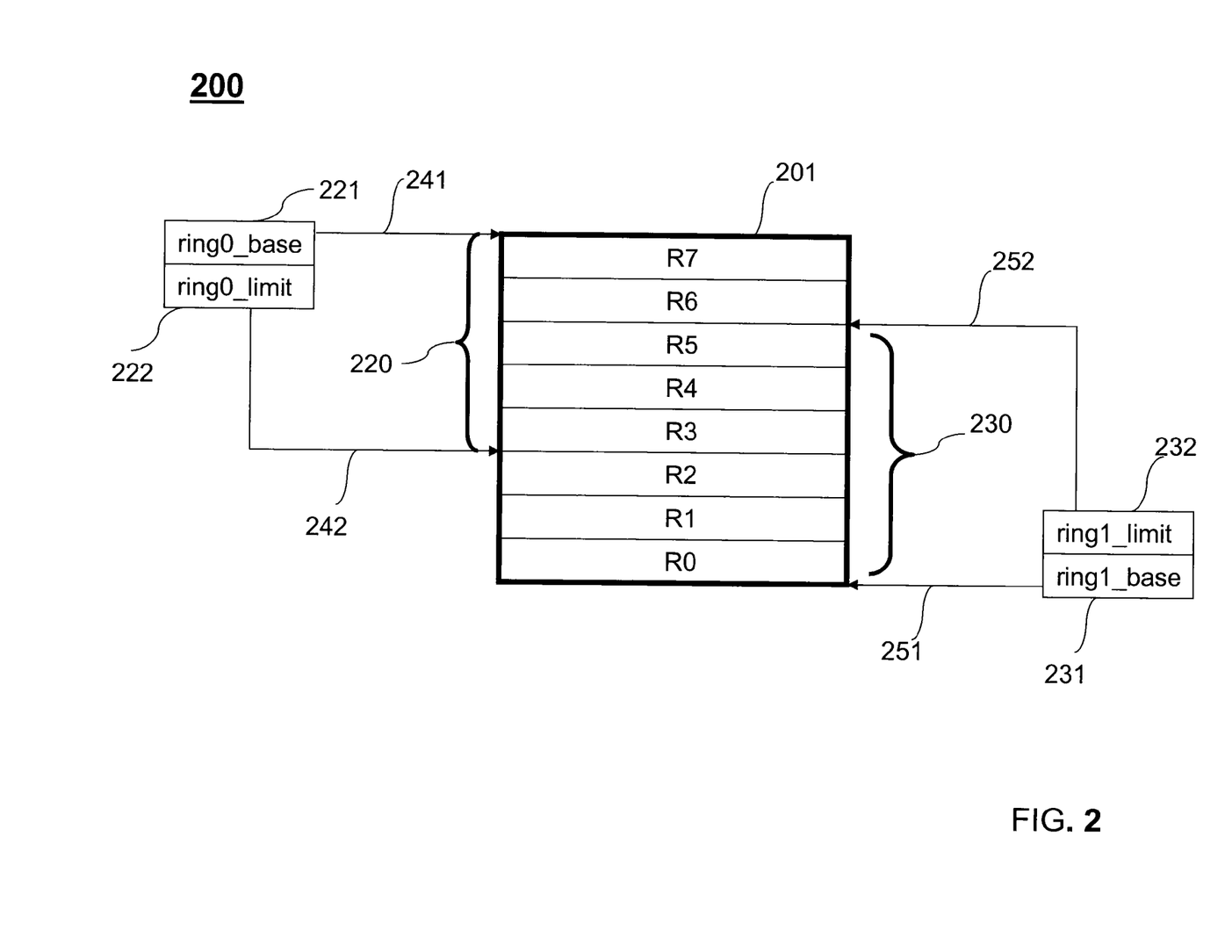
FIG. 2 is the example register array of FIG. 1 logically divided into two register rings according to the teachings of this disclosure.

FIG. 2 illustrates an exemplary definition of ring0 220 and ring1 230 in the register array 201. Ring0 220 is defined from the top of the register array 201 to a predefined location within the array 201. The pointer ring0_base 221 points to the base of ring0 241, and pointer 222 points to the predefined limit 242 up to which ring0 is defined. Ring1 230 is defined from the bottom of the register array 201 to a predefined location within the array 201. The pointer ring1_base 231 points to the base of ring1 251, and pointer 232 points to the predefined limit 252 up to which ring1 is defined. The registers between ring0_limit 242 and ring1_limit 252, for example, registers R3-R5, belong to the overlap area.

Processes identified as belonging to ring0_processes are allocated registers beginning at ring0_base 241 and sequentially to ring0_limit 242. Processes identified as belonging to ring1_processes are allocated registers beginning at ring1_base 251 and sequentially to ring1_limit 252. Ring0 220 and ring1 230 are therefore, in general, allocated beginning at opposite ends of the register array 201. Registers in the overlap area between ring0_limit 242 and ring1_limit 252 may be allocated to processes from either ring0_processes or ring1_processes. For example, ring0 220 is allocated sequentially up to either ring0_limit 242 or up to the last free register before registers currently allocated to ring1_processes, whichever that occurs first. Example register allocations are described below.

Figure 3A:
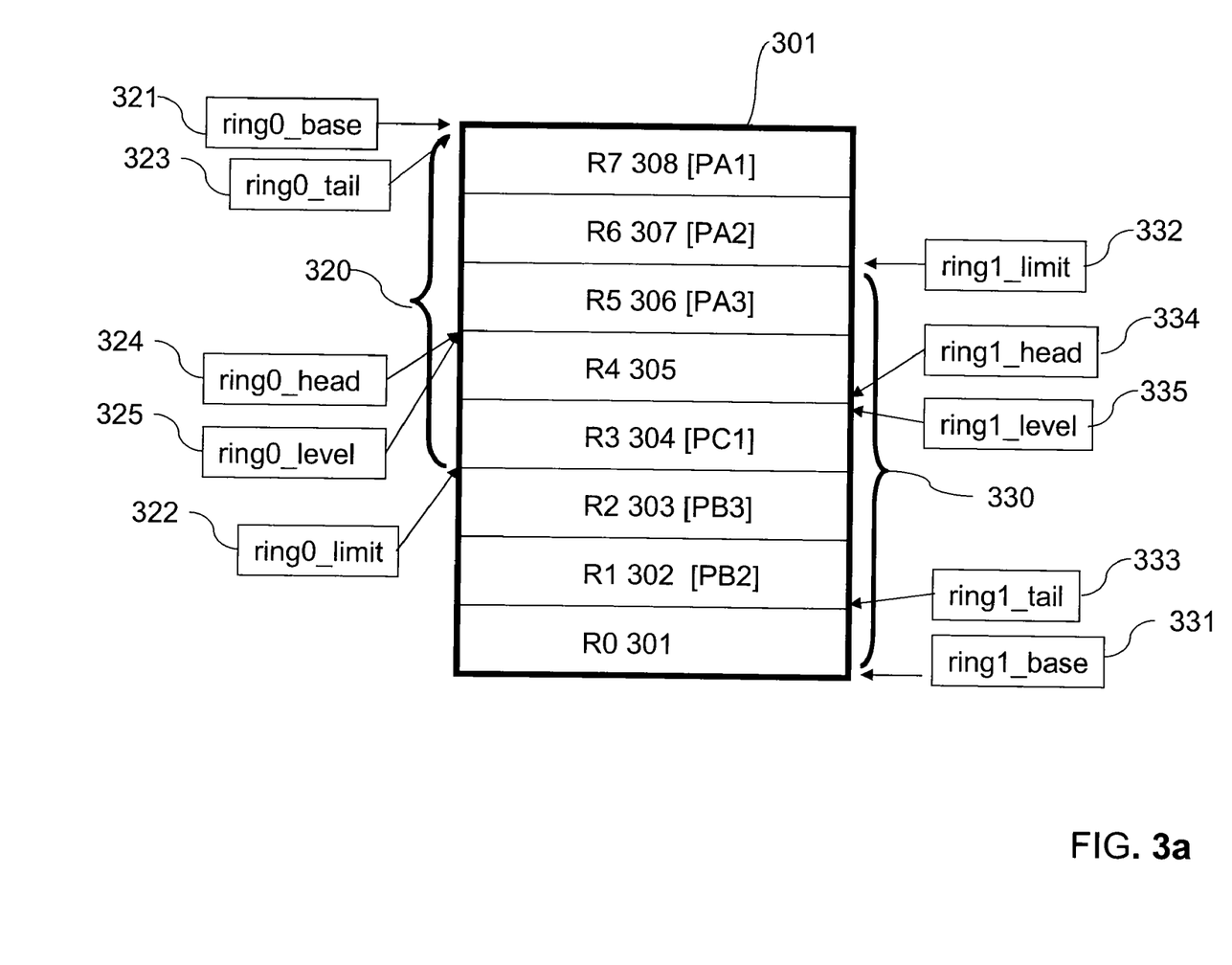
FIG. 3a illustrates the operation of a register management method in one embodiment of the present invention.
Figure 3B:
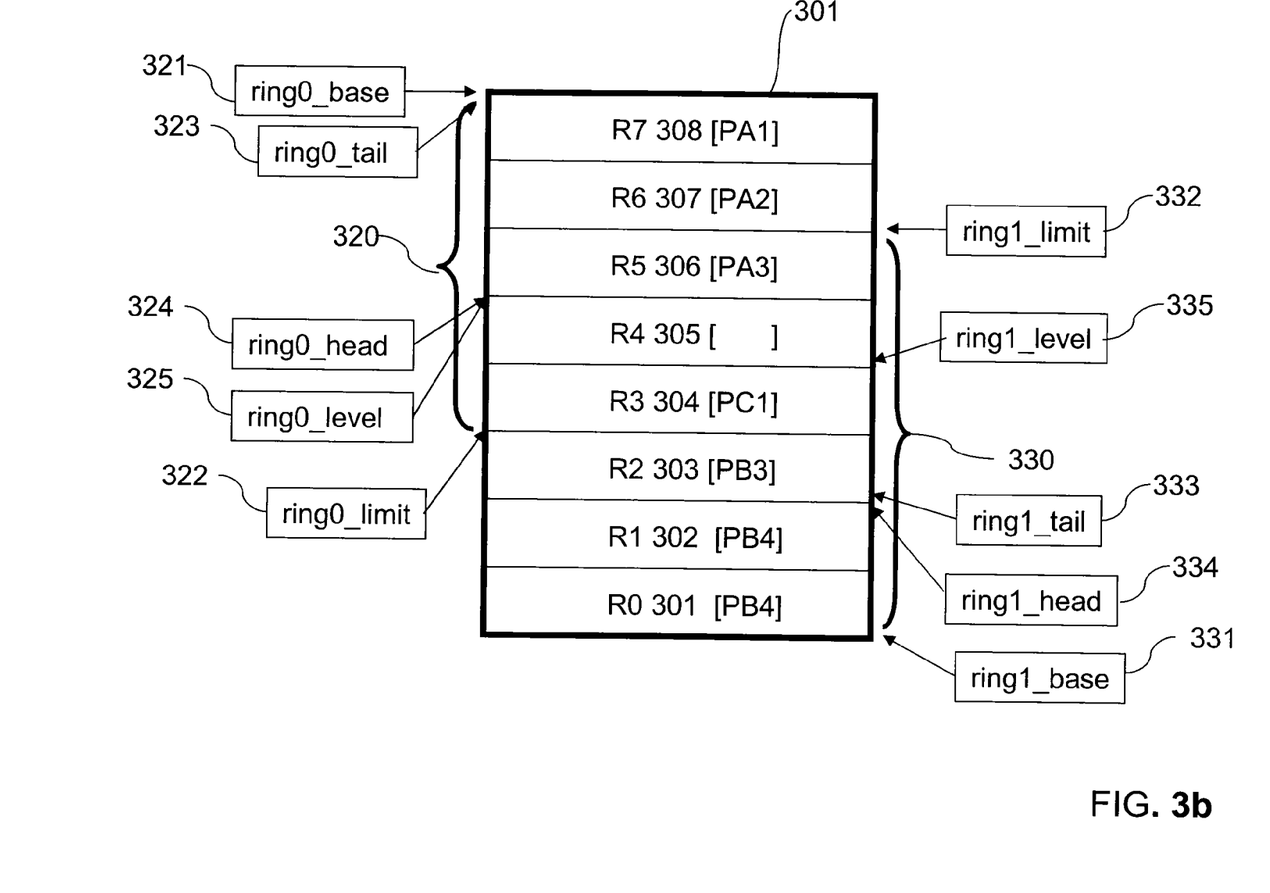
FIG. 3b further illustrates the operation of the register management method of FIG. 3a, according to an embodiment of the present invention.

FIG. 3a and FIG. 3b illustrate allocations of registers in a register array 301 at two instances in time in an embodiment of the present invention. In the example shown, three types of concurrently executing processes are allocated registers: processes of type A (PA), processes of type B (PB) and processes of type C (PC). There may be one or more instances of each type of process that is concurrently executing. The processes PA, PB, and PC, may represent any concurrently executing processes including threads. The methods and systems disclosed herein have the pool of available processes divided among the register allocation rings. It may be determined, for example, that the processes PA will be allocated registers from ring0 (i.e., processes of type A are assigned to the group ring0_processes) while the other processes (PB and PC) are allocated registers from ring1 (i.e., processes of types B and C are assigned to ring1_processes). By analyzing the processes PA, PB ad PC, dependencies among them can be determined.

The decision to group the processes to have processes PA in one group and the other processes PB and PC in another group may primarily be based on preventing deadlock based on analyzing the resource requirements of each type of process. For example, processes PA and processes PB may depend upon each other, thus causing potential deadlock situations or long wait situations due to each other. Also, compared to other processes in the process mix, processes PA may require access to more register resources than other processes. It may also be the case that dependencies among processes PB and processes PC are not substantial, at least when compared to dependencies between process PA and processes PB or PC. Therefore, PA may be assigned to the ring0_processes set and all other processes may be assigned to the ring1_processes set.

FIG. 3a shows an example situation in register array 301 at an instant in time during the operation of a computer implementing the teachings of this disclosure. FIG. 3a also illustrates, for example, some data elements associated with implementing the teachings of the present invention. Three registers, R7 308, R6 307 and R5 306, have been allocated in ring0 320 to PA processes. Starting at the top of the register array 301, registers 308, 307, and 306 have been allocated to PA process workloads PA1, PA2, and PA3 respectively. As each register in ring0 320 is allocated, the pointer ring0_head 324 may be moved to point to the last allocated register in ring0 320.

The first request by a process PA for register resources may have resulted in the allocation of register R7 308, the second request in the allocation of register R6 307, and the third request in the allocation of register R5 306. Therefore, after having allocated registers for the process PA workloads PA1-PA3, the pointer ring0_level 325 may point to R5 306, and is indicative of the currently allocated register in ring0 320 that is closest to the ring0_limit 322. In the example shown in FIG. 3a, the pointer ring0_head 324 is also pointing at the same location R5 306 as ring0_level 325. Ring0_head 324 is intended to point to the last allocated register in ring0. The pointer ring0_tail 323 is intended to point to the register farthest away from ring0_base 321 (or ring0_head if allocations have wrapped around) where the register has been freed from a previous allocation and all registers between that and ring0_base 321 are available for allocation. In the situation shown in FIG. 3a, ring0_tail 323 is pointing to the same location as ring0_base 321 because no registers may have been freed as yet in ring0 320.

Still referring to FIG. 3a, in ring1 330, two registers, R1 302 and R2 303, are allocated to processes PB (i.e., PB2 and PB3 respectively) and one register R3 304 is allocated to PC1, a process of type PC. Accordingly, ring1_level 335 and ring1_head 334 are pointing to register R3 304. In the example embodiment of FIG. 3a, register R0 301 has been freed subsequent to a previous allocation and can be reallocated to a process in ring1_processes. When register R0 301 was freed, ring1_tail 333 may have been moved to point to R1 302.

FIG. 3b illustrates the operation of the example register array 301 illustrated in FIG. 3a at a subsequent instance in time. Two changes have occurred from what is shown in FIG. 3a: workload PB2 has freed register R1 302 and a new workload PB4 has been allocated register R0 301. Accordingly, when PB2 freed register R1 302, ring1_tail 333 is moved to point to register R2 303. The new workload in ring1_processes, PB4, is allocated register R0 301 and R1 302 because the allocation required by PB4 may, if added to ring1 above the PC1 allocation where ring1_head 334 was previously pointing, may collide with the allocation of register R5 306 for workload PA3 of ring0 320. Therefore, the ring1 allocation wraps around to the base of the ring, ring1_base 331. In this case, registers R0 301 and R1 302 are free and the new workload PB4 is allocated to them. The pointer ring1_head 334 is accordingly moved to point to the last allocated R1 302. If registers R0 301 and R1 302 had not been free, the process PB having workload PB4 would have been required to wait until register resources in ring1 330 became available.

The overlap area provides the opportunity for allocating the available registers efficiently between ring0_processes and ring1_processes as workload demands change over the duration of an application. Having a large overlap area increases the opportunity for processes to share the register space more efficiently. However, non-overlap areas in ring0 320 and ring1 330 (i.e., registers for the exclusive use of ring0_processes and registers for the exclusive use of ring1_processes) should ideally be sized to substantially accommodate consistent workload demands of each of the process groups, ring0_processes and ring1_processes.

As described earlier, allocation of ring0 320 registers would wrap around to ring0_base 321 when a new allocation, if made without wrapping around, either would exceed ring0_limit 322 or exceed ring1_level 335. Similarly, allocation of ring1 330 registers would wrap around to ring1_base 331 when a new allocation, if made without wrapping around, either would exceed ring1_limit 332 or exceed ring0_level

325. In some embodiments, the wrapping around may be triggered earlier if it leads to more efficient utilization of the register space. For example, if a pre-determined amount of register space available between ring0_base 321 and ring0_tail 323 exists, then wrapping around ring0 320 allocations may make more registers available in the overlap area to processes of ring1_processes. A decision to wrap around one or both of the rings can be made dynamically based on current conditions of the register space and current workload mix.

Another embodiment of the present invention includes a method by which each type of process within a group of processes is limited to a threshold of maximum register space that can be allocated at a given time. The threshold for each process type may be set based on the size of the corresponding ring and the expected volume or frequency of register use of each process. For example, for the situations shown in FIGS. 3*a* and 3*b*, ring1_processes PB and/or PC may be limited to a predefined number of registers.

Figure 4:
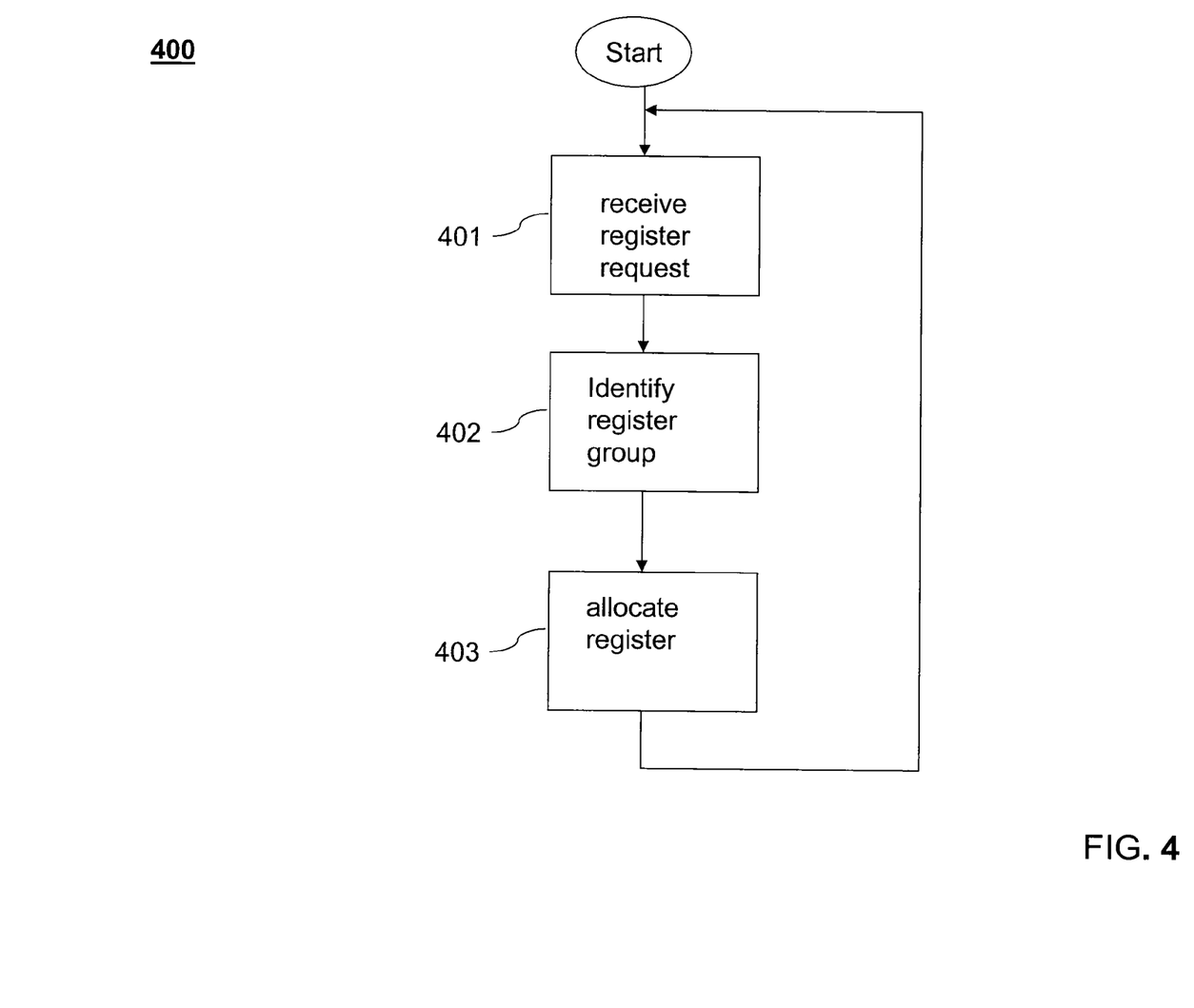
FIG. 4 is a flowchart of high level steps in the handling of a workload register allocation request according to one embodiment of the present invention.
Figure 5:
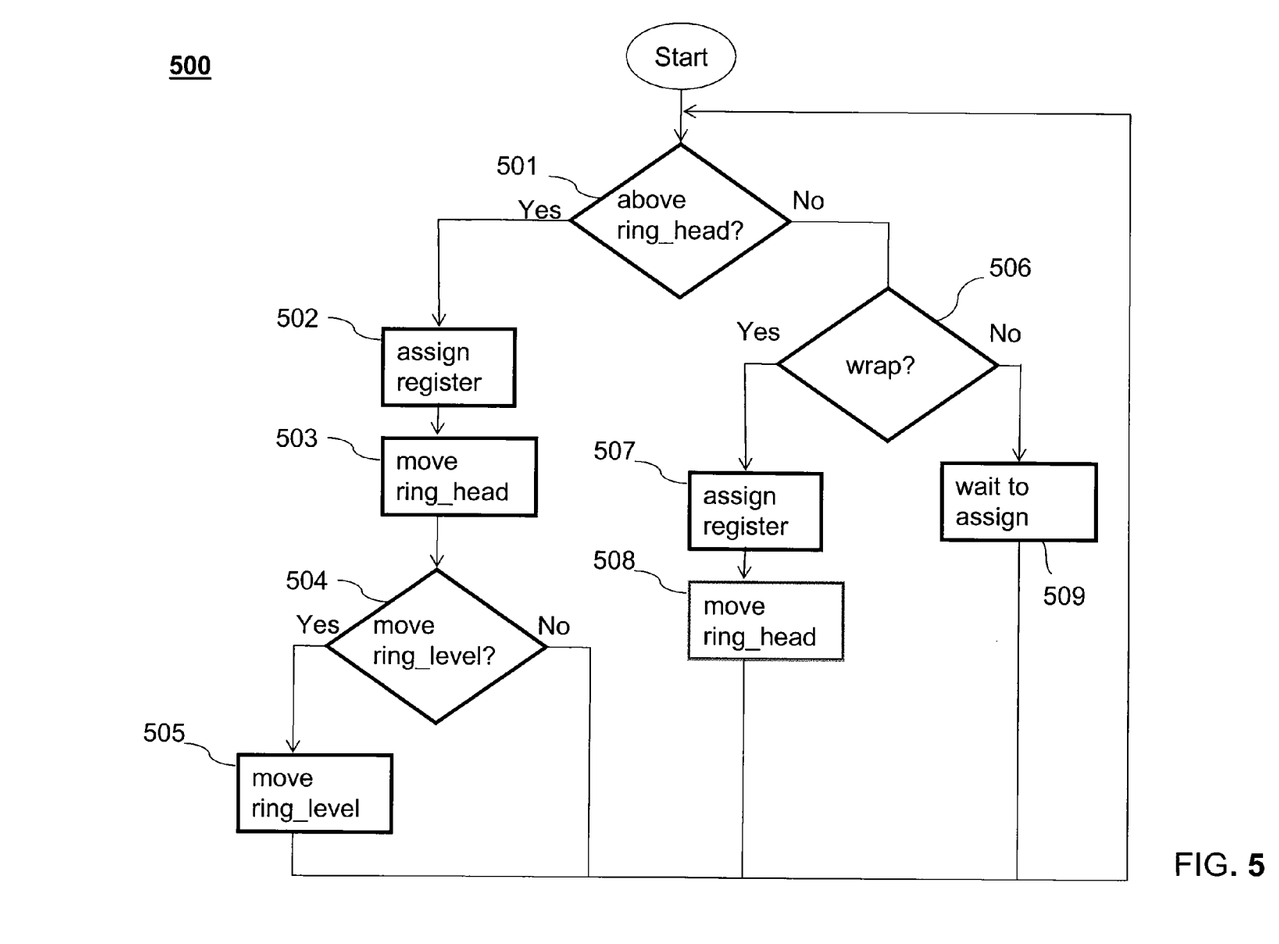
FIG. 5 shows detailed operations in assigning register resources according to an embodiment of the present invention.
Figure 6:
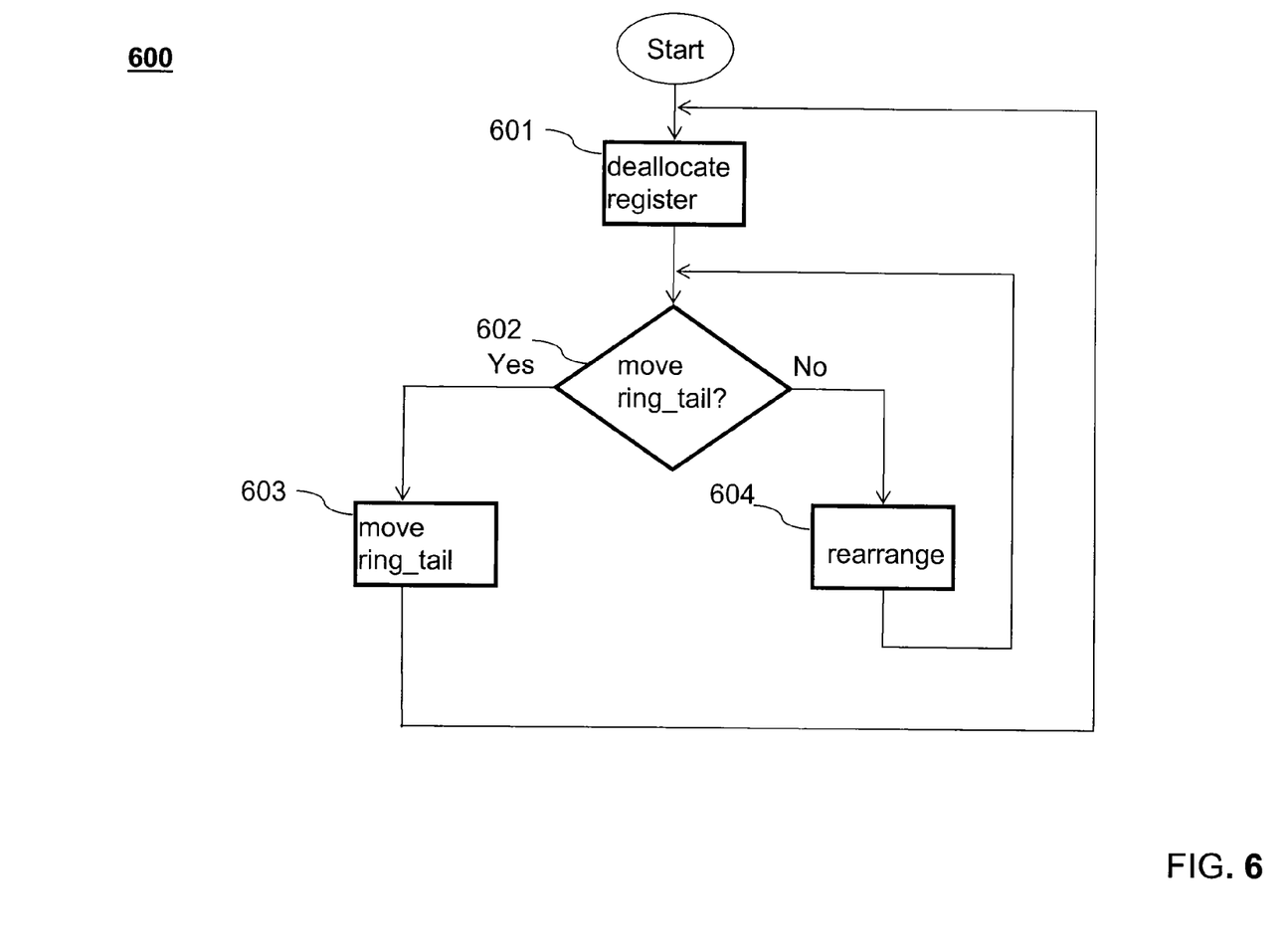
FIG. 6 shows detailed operations in deallocating previously assigned register resources in an embodiment of the present invention.

FIGS. 4-6 are flowcharts illustrating an example operation in register allocation and deallocation according to one embodiment of the present invention. FIG. 4 illustrates a flowchart 400 of the high level operation in a control module in a computer receiving a workload register allocation request 401 from a process. The control module receiving such a workload request may be responsible for managing an array of registers such as an array of general purpose registers 100. The request for allocation of registers can be originated from one or more concurrently executing processes such as, for example, processes PA, PB and PC, described above with relation to FIGS. 3*a* and 3*b*.

In step 402, the control module identifies to which of two register allocation process groups the incoming workload request belongs. For example, the incoming workload request can be identified as belonging to ring0_processes or ring1_processes, as described above with relation to FIGS. 3*a* and 3*b*. The characteristics and the types of processes of each group may be predetermined, for example, based on analyzing the processes for workload demands, inter-dependencies and potential deadlock conditions. The identification process 402 can be based on characteristics including the type of process. Once the process is identified 402, the control module can proceed to allocate registers 403.

FIG. 5 is a flowchart illustrating an example of processing that occurs when a register is allocated by the control module in response to an incoming workload register allocation request. The decisions and processing in FIG. 5 are shown with respect to one of the two rings, for example, either to ring0 or ring1, based on the identification that occurs in 402. By way of example, a first determination can be whether sufficient space exists above the location pointed to by the corresponding ring head pointer 501. If the head pointer is pointing to the same location as the corresponding level pointer, for example, in ring0 if ring0_head and ring0_level are pointing to the same location in ring0, then it must be determined if the required request can be accommodated without either exceeding the ring0_limit and without exceeding the ring1_level. If the head pointer is not pointing to the same location as the corresponding level pointer, then it must be determined if there is sufficient register space between the head pointer and the corresponding tail pointer.

For example, when register allocation in ring0 is wrapped around to the base of ring0, the free register space between the ring0_head and ring0_tail is considered when determining if the workload register allocation request can be accommodated. If there is sufficient space above the corresponding head pointer, the register space is allocated 502 and the head pointer is adjusted 503 to point to the last allocated register. It may then be determined whether the corresponding level pointer must be adjusted 504 to reflect the newly allocated register space. If, prior to the latest allocation the head and level pointers were pointing to the same location, then the level pointer may be moved to reflect the highest register address that is assigned to a workload as a result of the latest allocation 505.

If there is insufficient free register space above the head pointer 501 to assign for the latest workload register allocation request, then to accommodate the latest workload register allocation request, the allocation should wrap around the base of the ring 506. The wrap around may occur only if there is sufficient free register space at the base of the ring to be allocated. If the wrap around does occur, the register space is allocated 507 and the head pointer is adjusted accordingly 508. If the wrap around cannot occur because there is insufficient free register space at the base of the ring, the workload register allocation request may be held until space becomes available 509. The process 500 is repeated each time an incoming workload request is identified as a register allocation request.

FIG. 6 illustrates, for example, processing that occurs when a register is deallocated. The register deallocation may occur immediately upon receiving the request and identifying the corresponding register 601. Deallocation can cause the newly deallocated register space to be marked as available for allocation. If the deallocation occurs at the location pointed to by the tail pointer, then the tail pointer is adjusted 602 to point to the next assigned register to either the corresponding ring base or the corresponding ring head pointer 603. If the deallocation, for example, occurs in a register space that is not pointed to by the tail pointer, some form of rearrangement, either logical or physical, of the register space may be done 604. Process 600 is repeated for each deallocation request received.

Figure 7:
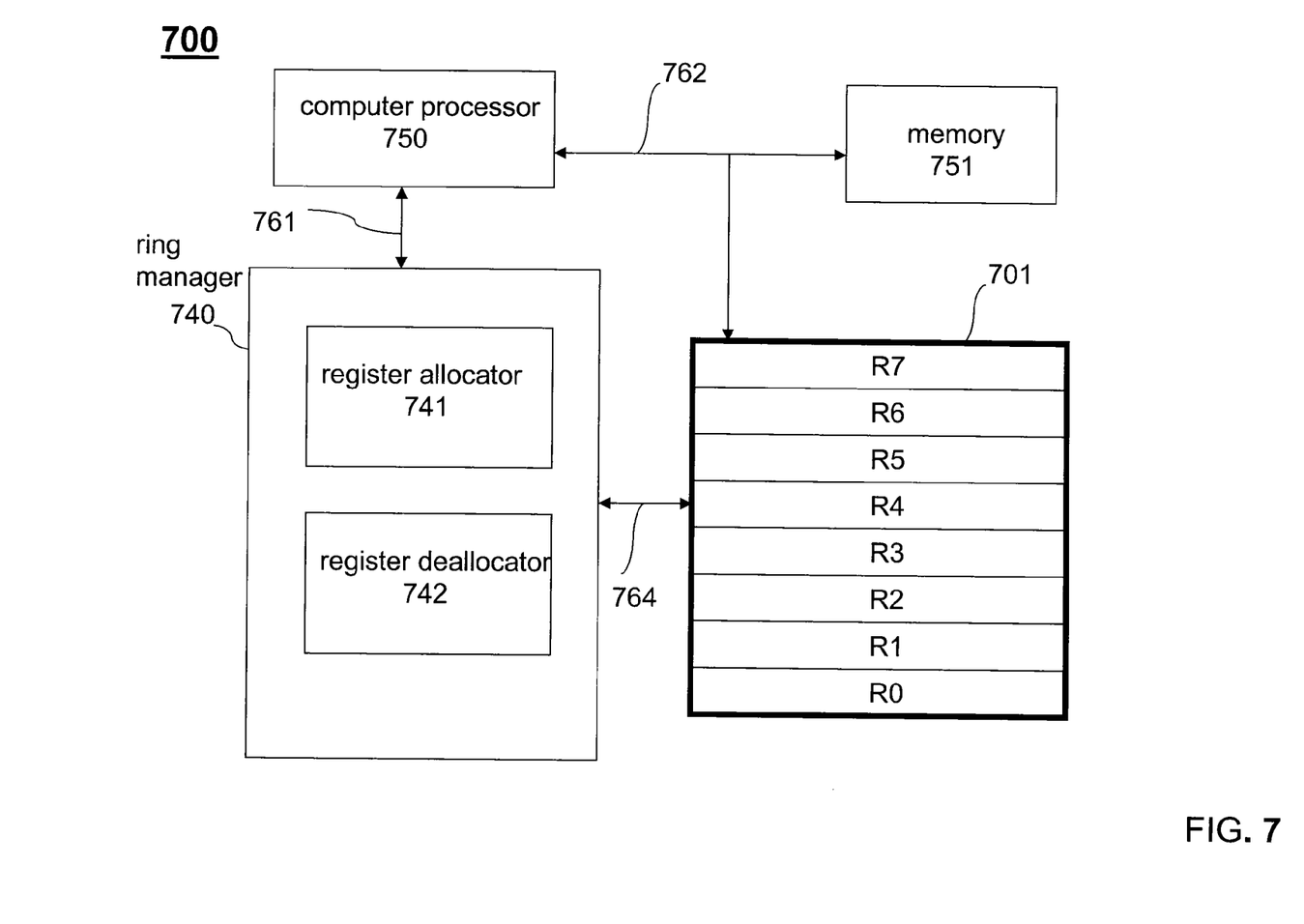
FIG. 7 illustrates a register management system having a register array and a ring management module, in one embodiment of the present invention.

FIG. 7 is an illustration of another embodiment of the present invention. In FIG. 7 a system 700 includes a register array 701, a ring manager module 740, a dynamic computer memory 751, and computer processor 750. The ring manager module 740 includes a register allocator 741 and register deallocator 742. The register array 701 includes any number of sequentially addressable registers. The ring manager module 740 controls the allocation and deallocation of registers within the register array 701 in accordance with the teachings of the present invention. Specifically, the register allocator module 741 allocates registers in response to incoming requests, and the register deallocator module 742 may deallocate registers that are no longer needed by the corresponding processes.

The management of the logical register allocation rings, ring0 and ring1 such as 320 and 330, is exercised by the ring manager 740 and its sub-modules 741 and 742. One or more computer processors 750 control some or all of the activity in using the register array 701, including use of ring manager 740 for allocating and deallocating registers. A dynamic memory 751 includes data and instructions that are written into and out of the register array 701 when directed by the one or more computer processors 750. Communication paths 761, 762 and 764 allow the computer processor 750, memory 751, ring manager 740 and register array 701 to be coupled for purposes of exchanging commands and data.

Embodiments of the present invention can also include graphics processor units (GPUs), central processing units (CPUs), a field programmable gate array (FPGA), or other types of processors. Many GPUs can have two or more primary shader processes or thread types, such as, but not limited to, vertex shaders (VS), pixel shaders (PS), and geometry shaders (GS) that are concurrently executed to render images on a screen. In some GPU designs, the different shaders are combined into a unified shader. A unified shader can include a single GPR array for holding inputs to all processes in the unified shader. The unified shader's GPR array should ideally be managed efficiently, attempting to keep all registers occupied during all times at which processing is occurring. The resources in a unified shader, including the GPR resources, are flexibly allocated between different workloads including vertices and pixels.

In many applications of GPUs, including when unified shaders are used, there can be substantial dependencies between, for example, VS and PS. The dependencies between VS and PS can lead to deadlock conditions if both these processes are limited to the same register resources. It can also be the case there are no substantial dependencies between VS, GS and any other shader process except PS. With reference to the exemplary embodiments above, one possible allocation would be to have PS in ring0_processes and VS, GS and any other shader process in ring1_processes. By splitting processes with dependencies so that each is assigned to a separate register allocation ring, and allocating the available GPR array based on the two logical allocation rings, efficient use of the register array is achieved. Therefore, the present invention can be implemented in GPUs, including those having unified shaders, to increase the efficiency of the use of register resources.

Embodiments of the present invention may be used in any computing device where register resources are to be managed among a plurality of concurrently executing processes. For example and without limitation, embodiments may include computers, game platforms, entertainment platforms, personal digital assistants, and video platforms. Embodiments of the present invention may be encoded in many programming languages including hardware description languages (HDL), assembly language, and C language.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer readable medium carrying one or more sequences of one or more instructions for execution by one or more processors to perform a method of allocating registers in a register array to a plurality of workloads, the instructions when executed by the one or more processors, cause the one or more processors to:
   (a) identify an incoming workload as belonging to a first process group or a second process group; and
   (b) allocate one or more target registers from the register array to the incoming workload, wherein the register array is logically divided to a first ring and a second ring, wherein the first ring and the second ring partially overlap, wherein the first ring and the second ring each includes one or more registers excluded from the partial overlap, and wherein the first process group is allocated registers in the first ring and the second process group is allocated registers in the second ring.

2. The computer readable medium of claim 1, wherein the target registers in the first ring are allocated in the order of sequentially decreasing register addresses and wherein the target registers in the second ring are allocated in the order of sequentially increasing register addresses.

3. The computer readable medium of claim 2, wherein the target registers in the first ring are allocated starting at the base of the first ring when allocations according to sequentially decreasing register addresses exceed a threshold address defined for the first ring, and wherein the target registers in the second ring are allocated starting at the base of the second ring when allocations according to sequentially increasing register addresses exceeds a threshold address defined for the second ring.

4. The computer readable medium of claim 1, wherein the first ring includes at least one register that is exclusively for workloads of the first process group.

5. The computer readable medium of claim 1, wherein the second ring includes at least one register that is exclusively for workloads of the second process group.

6. The computer readable medium of claim 1, wherein the first process group and the second process group each only includes processes that preclude deadlock therein.

7. The computer readable medium of claim 1, wherein the register array comprises general purpose registers.

8. The computer readable medium of claim 1, wherein the one or more processors include a graphics processing unit (GPU).

9. The computer readable medium of claim 8, wherein at least one of the first process group and the second process group comprise of shader processes.

10. The computer readable medium of claim 1, wherein the sequences of instructions are encoded using a hardware description language (HDL).

11. A system for managing a register array for use in a computer, the system comprising:
   (a) said register array logically divided to a first ring and a second ring, wherein the first ring and the second ring partially overlap, wherein the first ring and the second ring each includes one or more registers excluded from the partial overlap, and wherein the first ring contains each of the registers between the lowest addressable register of the register array up to a first ring limit and the second ring contains each of the registers between the highest addressable register of the register array down to a second ring limit;

(b) ring manager module comprising:
  (i) register allocator module that allocates a first available register from the first ring to an incoming workload belonging to a first process group or a first available register from the second ring to an incoming workload belonging to a second process group; and
  (ii) register deallocator module that deallocates a second register.

12. The system of claim 11, wherein the first process group and the second process group each only includes processes that preclude deadlock therein.

13. The system of claim 11, wherein the register array comprises general purpose registers.

14. The system of claim 11, wherein the computer includes game platforms.

15. The system of claim 11, wherein the computer includes entertainment platforms.

16. A register allocation method for use in a computer, the method comprising:
  (a) identifying an incoming workload request as belonging to a first process group or a second process group; and
  (b) allocating one or more target registers from a register array to the incoming workload, wherein the register array is logically divided to a first ring and a second ring, wherein the first ring and the second ring partially overlap, wherein the first ring and the second ring each includes one or more registers excluded from the partial overlap, and wherein the first process group is allocated registers in the first ring and the second process group is allocated registers in the second ring.

17. The register allocation method of claim 16, wherein the first process group and the second process group each only includes processes that preclude deadlock therein.

18. The register allocation method of claim 16, wherein the register array comprises general purpose registers.

* * * * *